United States Patent
Lu et al.

(10) Patent No.: US 11,503,582 B2
(45) Date of Patent: *Nov. 15, 2022

(54) METHOD FOR TRANSMITTING DATA IN INTERNET OF VEHICLES, AND TERMINAL DEVICE

(71) Applicant: GUANGDONG OPPO MOBILE TELECOMMUNICATIONS CORP., LTD., Dongguan (CN)

(72) Inventors: Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/131,634

(22) Filed: Dec. 22, 2020

(65) Prior Publication Data

US 2021/0112537 A1    Apr. 15, 2021

Related U.S. Application Data

(63) Continuation of application No. PCT/CN2018/094681, filed on Jul. 5, 2018.

(51) Int. Cl.
*H04W 72/04* (2009.01)
*H04W 4/46* (2018.01)
*H04W 84/18* (2009.01)

(52) U.S. Cl.
CPC .......... *H04W 72/042* (2013.01); *H04W 4/46* (2018.02); *H04W 72/0446* (2013.01); *H04W 72/0453* (2013.01); *H04W 84/18* (2013.01)

(58) Field of Classification Search
CPC ............................. H04W 72/042; H04W 4/46
See application file for complete search history.

(56) References Cited

U.S. PATENT DOCUMENTS

| 2016/0066337 A1 | 3/2016 | Sartori et al. |
| 2017/0127405 A1 | 5/2017 | Agiwal et al. |
| (Continued) | | |

FOREIGN PATENT DOCUMENTS

| CN | 105813204 A | 7/2016 |
| CN | 106303899 A | 1/2017 |
| (Continued) | | |

OTHER PUBLICATIONS

PCT Written Opinion of The International Searching Authority issued in corresponding International Application No. PCT/CN2018/094681, dated Apr. 12, 2019, 9 pages.
(Continued)

*Primary Examiner* — Ronald B Abelson
(74) *Attorney, Agent, or Firm* — Bayes PLLC (57) ABSTRACT

A method for transmitting data in the Internet of Vehicles, and a terminal device are provided. Resources used for repeated sidelink transmission may be determined, which is beneficial in improving the reliability of data transmission. The method includes that a terminal device receiving first control information sent by a network device. The first control information is used to determine resource information used for repeated sidelink transmission. The method also includes that according to the first control information, the terminal device determining resources used for repeated sidelink transmission.

26 Claims, 2 Drawing Sheets

(56) References Cited

U.S. PATENT DOCUMENTS

| | | | |
|---|---|---|---|
| 2017/0230956 | A1 | 8/2017 | Kim et al. |
| 2017/0289733 | A1* | 10/2017 | Rajagopal ............. H04L 5/0096 |
| 2019/0075546 | A1 | 3/2019 | Yasukawa et al. |
| 2019/0230633 | A1 | 7/2019 | Chae et al. |
| 2020/0077434 | A1 | 3/2020 | Kim et al. |
| 2020/0137782 | A1* | 4/2020 | Su ..................... H04W 72/1273 |

FOREIGN PATENT DOCUMENTS

| | | |
|---|---|---|
| CN | 106797635 A | 5/2017 |
| CN | 107027105 A | 8/2017 |
| CN | 107534828 A | 1/2018 |
| CN | 107925906 A | 4/2018 |
| CN | 108024310 A | 5/2018 |
| CN | 108141847 A | 6/2018 |
| EP | 3481125 A1 | 7/2017 |
| JP | 2017524308 A | 8/2017 |
| RU | 2658663 C1 | 6/2018 |
| WO | 2015115506 A1 | 8/2015 |
| WO | 2016163972 A1 | 10/2016 |
| WO | 017077976 A1 | 5/2017 |
| WO | 2017196129 A1 | 11/2017 |
| WO | 2018004322 A1 | 1/2018 |
| WO | 2019007154 A1 | 1/2019 |
| WO | 2019090522 A1 | 5/2019 |
| WO | 2020/006737 A1 | 1/2020 |

OTHER PUBLICATIONS

3rd Generation Partnership Project; Technical Specification Group Radio Access Network; Evolved Universal Terrestrial Radio Access (E-UTRA); Physical layer procedures (Release 15), Technical Specification, 3GPP TS 36.213 V15.1.0 (Mar. 2018), 495 pages.
Schilienz,J. et. al., "Device to Device Communication in LTE—Whitepaper" D2D Communication—1MA264_0e, Rohde & Schwarz.
Extended European Search Report issued in corresponding European Application No. EP 18 92 5199.4, dated Jun. 1, 2021, 14 pages.
"Details of resource pool design for sidelink V2V communication", Agenda item: 7.2.2.3, Source: Intel Corporation, 3GPP TSG RAN WG1 Meeting #86, R1-166515, Gothenburg, Sweden, Aug. 22-26, 2016, 8 pages.
"Scheduling assignment for sidelink V2V communication", Agenda item: 7.2.2.5, Source: Intel Corporation, 3GPP TSG RAN WG1 Meeting #86, R1-166516, Gothenburg, Sweden, Aug. 22-26, 2016, 9 pages.
"Discussion on SCI contents for V2V", Agenda Item: 6.2.2.5, Source: Huawei, HiSilicon, 3GPP TSG RAN WG1 Meeting #85, RI-164103, Nanjing, China, May 23-27, 2016, 6 pages.
"UE procedures related to Sidelink", 3GPP Draft; SUBC_14-D2D—, 3rd Generation Partnership Project (3GPP) Mobile Competence Centre; 650, Route Des Lucioles; F-06921 Sophia-Antipolis Cedex; France, Dec. 3, 2014, XP050919795, Retrieved from the Internet: URL: http://www.3gpp.org/ftp/tsg_ran/WG1_RL1/TSGR_79/Docs/, 18 pages.
"Enhancement to resource pool structure of PC5-based V2V", Agenda item: 7.3.2.2.2, Source: NEC, 3GPP TSG-RAN WG1 Meeting #84, R1-160394, St. Julian's, Malta, Feb. 15-19, 2016, 4 pages.
"On enhancements to resource pool configuration for V2V communication", Agenda item: 6.2.8.1.1, Source: Intel Corporation, 3GPP TSG RAN WG1 Meeting #83, R1-156690, Anaheim, USA, Nov. 15-22, 2015, 8 pages.
First Office action issued in corresponding Canadian Application No. 3,105,316, dated Dec. 20, 2021, 4 pages.
First Office Action issued in corresponding Chinese Application No. 202110069960.3, dated Jun. 1, 2022, 21 pages.
Notice of Priority Review of Patent Application issued in corresponding Chinese Application No. 202110069960.3, dated May 19, 2022, 6 pages.
First Office Action issued in corresponding Chinese Application No. 202110190401.8, dated Jul. 5, 2022, 19 pages.
First Office Action issued in corresponding Japanese Application No. 2021-500112, dated Jun. 24, 2022, 12 pages.
International Search Report and Written Opinion from the International Searching Authority Re. Application No. PCTCN2018/094680, dated Apr. 10, 2019, 13 pages.
Extended European Search Report issued in corresponding European Application No. 18925610.0, dated Jun. 21, 2021, 8 pages.
First Office Action issued in corresponding Russian Application No. 2021102254, dated Aug. 3, 2021, 12 pages.
First Office Action issued in corresponding Indian Application No. 202127004519, dated Jan. 18, 2022, 6 pages.
First Office Action issued in corresponding European Application No. 18925610.0, dated Mar. 14, 2022, 10 pages.
First Office Action issued in corresponding Japanese Application No. 2021-500114, dated Jun. 24, 2022, 10 pages.
"SA design for V2V", R1-162680, Source: Samsung, 3GPP TSG RAN WG1 #84bis, Busan, Korea Apr. 11-15, 2016, 5 pages.
Second Office Action issued in corresponding Chinese application No. 202110069960.3, dated Aug. 5, 2022.
First Office Action issued in corresponding Taiwanese application No. 108123281, dated Aug. 15, 2022.
First Office Action issued in corresponding Korean application No. 10-2021-7000155, dated Sep. 21, 2022.
Ericsson, "Resource pool sharing between mode 3 and mode 4 UEs", R1-1802522, 3GPP TSG-RAN WG1 Meeting #92 Athens, Greece, Feb. 26-Mar. 2, 2018.
Intel Corporation, "Signaling Details for eNB Controlled Sidelink V2V Communication", R1-162364, 3GPP TSG RAN WG1 Meeting #84bis Busan, Korea Apr. 11-15, 2016.
Motorola Mobility, "Introduction of V2X", R1-1703432, 3GPP TSG-RAN WG1 Meeting #88 Athens, Greece, Feb. 13-17, 2017.

* cited by examiner

METHOD FOR TRANSMITTING DATA IN INTERNET OF VEHICLES, AND TERMINAL DEVICE

CROSS-REFERENCE TO RELATED APPLICATION

This application is a continuation of International Application No. PCT/CN2018/094681, filed Jul. 5, 2018, the entire contents of which are incorporated herein by reference.

BACKGROUND

The embodiments of the present disclosure relate to the field of communications, and in particular, to a method for transmitting data in Internet of Vehicles and a terminal device.

The Internet of Vehicles system is a sidelink (Sidelink, SL) transmission technology based on the Long-Term Evaluation Vehicle to Vehicle (LTE V2V). Different from the manner of receiving or sending communication data through the base station in the traditional LTE system, the Internet of Vehicles system adopts terminal-to-terminal direct communication, so it has higher spectrum efficiency and lower transmission delay than the traditional LTE system.

In the Internet of Vehicles system, the data transmission resources of the terminal device on the sidelink can be determined by the network device. Specifically, the terminal device may receive Downlink Control Information (DCI) from the network device, and then determine the transmission resource of the sidelink data according to the downlink control information, where the DCI carries the control information corresponding to the sidelink data transmission, such as time-frequency resource allocation information, etc. The terminal device that receives the DCI obtains information such as the time-frequency resource location for data transmission by detecting the DCI and transmits sidelink data on the time-frequency resource.

The Vehicle to Everything (V2X) system based on New Radio (NR) needs to support automatic driving, which puts forward a relatively high requirement for data interaction between vehicles, such as a higher reliability requirement. Therefore, how to achieve reliable transmission of the sidelink is an urgent problem to be solved.

SUMMARY

The embodiments of the present disclosure provide a method for transmitting data in Internet of Vehicles and a terminal device, for determining the resources used for multiple transmissions of the sidelink, which realizes multiple transmissions of sidelink data, and is beneficial to provide reliability of data transmission.

In a first aspect, a method for transmitting data in Internet of Vehicles is provided, including: receiving, by a terminal device, first control information sent by a network device, wherein the first control information is used to determine resource information used for multiple transmissions of a sidelink; and determining, by the terminal device, a resource used for the multiple transmissions of the sidelink according to the first control information.

In a second aspect, a terminal device is provided, which is used to execute the foregoing first aspect or any possible implementation of the first aspect. Specifically, the terminal device includes a unit for executing the foregoing first aspect or any possible implementation manner of the first aspect.

In a third aspect, a terminal device is provided. The terminal includes a processor and a memory. The memory is used to store a computer program, and the processor is used to call and run the computer program stored in the memory to execute the method in the above-mentioned first aspect or each of its implementation manners.

In a fourth aspect, a chip is provided, which is used to implement the method in the first aspect or its implementation manners.

Specifically, the chip includes a processor used to call and run a computer program from the memory, so that a device installed with the chip executes the method in the first aspect or its implementation manners.

In a fifth aspect, a computer-readable storage medium is provided for storing a computer program that enables a computer to execute the method in the first aspect or its implementation manners.

In a sixth aspect, a computer program product is provided, including computer program instructions that cause a computer to execute the method in the first aspect or its implementation manners.

In a seventh aspect, a computer program is provided, which, when running on a computer, causes the computer to execute the method in the first aspect or its implementation manners.

Based on the above technical solutions, the terminal device can determine the resources used for multiple transmissions of the sidelink according to the first control information of the network device, and further, the terminal device can send the sidelink data to other terminal device(s) multiple times on the resource for multiple transmissions of the sidelink, thereby improving the reliability of the sidelink transmission.

DETAILED DESCRIPTION

The technical solutions in the embodiments of the present disclosure will be described below in conjunction with the drawings in the embodiments of the present disclosure. Obviously, the described embodiments are part of the embodiments of the present disclosure, not all of the embodiments. Based on the embodiments in the present disclosure, all other embodiments obtained by those of ordinary skill in the art without creative work shall fall within the protection scope of the present disclosure.

It should be understood that the technical solutions of the embodiments of the present disclosure may be applied to a Device to Device (D2D) communication system, for example, a car networking system that performs D2D communication based on Long Term Evolution (LTE). Unlike the traditional LTE system in which communication data between terminals is received or sent through a network device (for example, a base station), the Internet of Vehicles system uses terminal-to-terminal direct communication, so it has higher spectrum efficiency and lower transmission delay.

Optionally, the communication system on which the Internet of Vehicles system is based may be a Global System of Mobile communication (GSM) system, a Code Division Multiple Access (CDMA) system, a Wideband Code Division Multiple Access (WCDMA) system, General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a 5G New Radio (NR) system, etc.

The terminal device in the embodiments of the present disclosure may be a terminal device capable of implementing D2D communication. For example, it may be a vehicle-mounted terminal device, a terminal device in a 5G network, or a terminal device in a future evolved Public Land Mobile Network (PLMN), which is not limited in the embodiments of the present disclosure.

Figure 1:
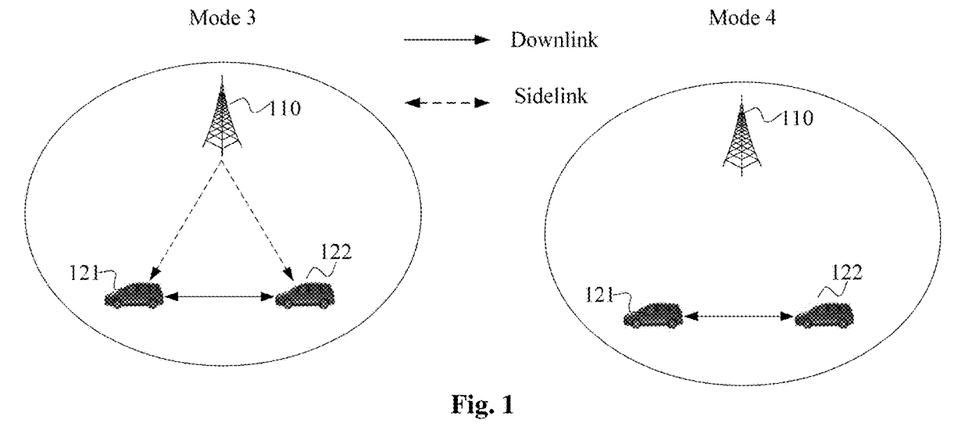
FIG. 1 is a schematic diagram of a communication system architecture provided by an embodiment of the present disclosure.

FIG. 1 is a schematic diagram of an application scenario of an embodiment of the present disclosure. FIG. 1 exemplarily shows one network device 110 and two terminal devices 121 and 122. Optionally, the wireless communication system in the embodiments of the present disclosure may include multiple network devices, and the coverage of each network device may include other numbers of the terminal device, which is not limited in the embodiments of the present disclosure.

Optionally, the wireless communication system may also include other network entities such as a Mobile Management Entity (MME), a Serving Gateway (S-GW), a Packet Data Network Gateway (P-GW), etc., or, the wireless communication system may also include Session Management Function (SMF), Unified Data Management (UDM), Authentication Server Function (AUSF) and other network entities, which is not limited by the embodiments of the present disclosure.

In the Internet of Vehicles system, the terminal devices may use mode 3 and mode 4 to communicate. Specifically, the terminal device 121 and the terminal device 122 may communicate via a D2D communication mode. When performing D2D communication, the terminal device 121 and the terminal device 122 directly communicate through the D2D link, that is, a sidelink SL. In mode 3, the transmission resources of the terminal device are allocated by the base station, and the terminal device may send data on the SL according to the resources allocated by the base station. The base station may allocate a resource for a single transmission to the terminal device or allocate a resource for semi-static transmission to the terminal. In mode 4, the terminal device adopts a transmission mode of sensing plus reservation, and the terminal device autonomously selects transmission resources from the SL resources. Specifically, the terminal device obtains a set of available transmission resources in the resource pool by means of sensing, and the terminal device randomly selects one resource from the set of available transmission resources for data transmission.

In the Internet of Vehicles system, other transmission modes may also be defined. For example, mode 5 indicates that the sidelink transmission resources of the terminal device are allocated by the base station, and mode 6 indicates that the terminal device independently selects the sidelink transmission resources, which is not limited by this embodiment.

D2D communication may refer to Vehicle to Vehicle ("V2V") communication or Vehicle to Everything (V2X) communication. In V2X communication, X may generally refer to any device with wireless receiving and sending capabilities, such as but not limited to slow-moving wireless devices, fast-moving vehicle-mounted devices, or network control nodes with wireless transmitting and receiving capabilities. It should be understood that the embodiments of the present disclosure are mainly applied to the scenario of V2X communication and can also be applied to any other D2D communication scenario, which is not limited to the embodiments of the present disclosure.

Figure 2:
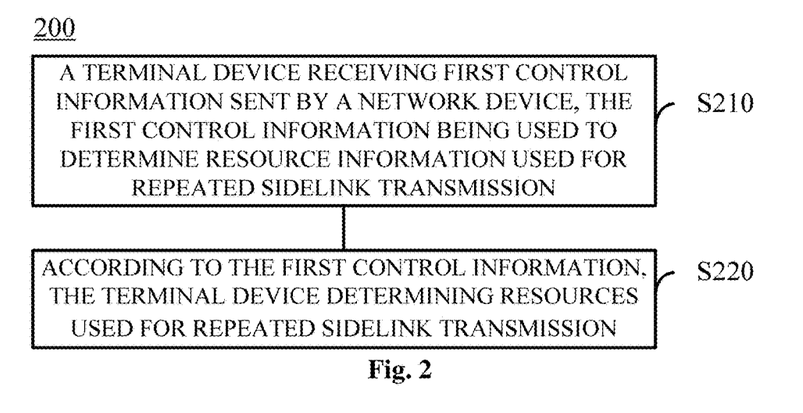
FIG. 2 is a schematic diagram of a method for transmitting data in Internet of Vehicles provided by an embodiment of the present disclosure.

FIG. 2 is a schematic flowchart of a method for transmitting data in Internet of Vehicles according to an embodiment of the present disclosure. The method may be executed by a terminal device in the Internet of Vehicles system, such as a terminal device 121 or a terminal device 122. As shown in FIG. 2, the method 200 includes the terminal device receiving first control information sent by the network device, where the first control information is used to determine resource information used for multiple transmissions of the sidelink; and the terminal device determining a resource used for multiple transmissions of the sidelink according to the first control information.

Specifically, the terminal device may receive the first control information sent by the network device. Optionally, the first control information may be DCI, or may also be other downlink information, which is not limited in this embodiment of the present disclosure. The first control information may be used by the terminal device to determine the resource used for multiple transmissions of the sidelink. For example, the first control information may directly or indirectly indicate the resource used for the multiple transmissions, so that the terminal device can determine the resource used for multiple transmissions of the sidelink according to the first control information.

It should be noted that the embodiments of the present disclosure can be applied to the following two situations.

First situation: the terminal device determines the resource used for multiple transmissions of the sidelink according to the first control information and can further receive data sent multiple times by other terminal device on the resource; optionally, the terminal device receiving the same data sent by other terminal device multiple times on this resource can improve the reliability of data transmission on the sidelink.

Second situation: the terminal device determines the resource used for multiple transmissions of the sidelink according to the first control information and can further send sidelink data to other terminal device multiple times on the resource; optionally, the terminal device sending the same data to other terminal device multiple times on the resource can improve the reliability of data transmission on the sidelink.

That is, the resource used for multiple transmissions of the sidelink may be the resource used by the terminal device to send sidelink data to other terminal device multiple times. In this case, for the terminal device, the resource may be considered as the sending resource, or it may be the resource used by other terminal device to send sidelink data to the terminal device multiple times (the resource may be configured by the network device for another terminal device). In this case, for the terminal device, the resource may be regarded as a receiving resource. The following takes the second situation as an example for description. The embodiments in the present disclosure may also be applied to the first situation. For simplicity, no detailed description is given.

Optionally, the resource information described in the embodiments of the present disclosure may include time domain resource information and/or frequency domain resource information or may also include other resource information used in sidelink transmission, such as code domain resource information, etc., which is not limited by the embodiments of the present disclosure.

It should be understood that the resource described in the embodiments of the present disclosure may also be referred to as a transmission resource or a time-frequency resource and may be used to carry data or signaling during sidelink communication. For example, the resource may be used for multiple transmissions of Physical Sidelink Control Channel (PSCCH) or Physical Sidelink Shared Channel (PSSCH).

It should be understood that in the embodiments of the present disclosure, the terminal device may determine a set of resources according to the first control information, and the set of resources may be used for each of the multiple transmissions, that is, the same resources are used for each transmission. Alternatively, the terminal device may determine multiple sets of resources according to the first control information, each set of resources corresponds to one transmission, each transmission uses the corresponding resource, and the frequency domain resources used for each transmission may be the same or different, which is not specifically limited by the embodiments of the present disclosure.

Optionally, in some embodiments, if only the time domain resource information used for the multiple transmissions can be determined according to the first control information, in this case, the frequency domain resources used for the multiple transmissions may be implicitly determined. For example, the terminal device may use a fixed frequency domain resource, and the fixed frequency domain resource may be pre-configured on the terminal device or configured in advance by the network device or other terminal device, and then it is only needed to inform the terminal device in advance the available frequency domain resources.

Alternatively, in other embodiments, if only the frequency domain resource information used for the multiple transmissions can be determined based on the first control information, in this case, the time domain resources used for the multiple transmissions may be implicitly determined. For example, the terminal device may use fixed time domain resources, and the fixed time domain resources may be pre-configured or may be configured by a network device or other terminal device, and it is only necessary to inform the terminal device of the available time domain resources in advance. Alternatively, there is a one-to-one correspondence between the time domain resources that can be used by the terminal device and the time domain resources that receive the first control information. In this way, it is possible to determine which time domain resources are available according to the time domain resources that receive the first control information. For example, the terminal device may determine the $(s*T)^{th}$ time unit after the time unit at which the first control information is received as the time domain resource for the multiple transmissions. Optionally, T may be 2, 4, 8, etc., $1<=s<=M$, and M represents a total number of the multiple transmissions.

Optionally, in some embodiments, the time domain resource and the frequency domain resource used for the PSCCH and/or PSSCH may both be determined by the first control information. In some cases, if there is a corresponding relationship between the time domain resources or the frequency domain resources of the PSSCH and the corresponding PSCCH, it is possible to only determine one of them through the first control information and determine the time domain resource or the frequency domain resource corresponding to the other according to the corresponding relationship.

For example, if the time domain start positions of the PSCCH and the corresponding PSSCH have a corresponding relationship, for example, the first symbol in a subframe is the time domain start position of the PSCCH, the PSCCH occupies 4 symbols, and the fifth symbol is the time domain start position of the PSSCH, that is, the time domain start positions of the PSCCH and its corresponding PSSCH are the first symbol and the fifth symbol in one subframe respectively, the first control information indicates the subframe corresponding to the PSCCH, and then, it can be determined that the time domain start positions of the PSCCH and PSSCH are the first and fifth symbols in the subframe.

For another example, if the frequency domain start positions of the PSCCH and the corresponding PSSCH have a corresponding relationship, the frequency start position of the PSCCH can be determined according to the first control information, and according to the corresponding relationship, the frequency domain start position of the PSSCH corresponding to the PSCCH can be determined. Optionally, if the frequency domain start positions of the PSCCH and its corresponding PSSCH are the same, only the first control information needs to be provided to indicate the frequency domain start position of the PSCCH or PSSCH.

That is, only part of the resource information used for multiple transmissions of the sidelink can be determined according to the first control information, and other resource information can be implicitly determined. For example, other resource information can be pre-configured on the terminal device, or pre-configured by a network device or other terminal device or may also have a corresponding relationship with known resource information (for example, the frequency domain resource or time domain resource for receiving the first control information), which is not limited by the embodiments of the present disclosure.

In the following, in conjunction with specific embodiments, methods for determining the time domain resource and the frequency domain resource for multiple transmissions of the sidelink are respectively introduced.

1. The Method for Determining the Time Domain Resource Used for Multiple Transmissions of the Sidelink It should be understood that in the embodiments of the present disclosure, the unit of the time domain resource may be called a time unit or a time domain unit, and a time unit may be a time slot, a symbol, a subframe, or a short Transmission Time Interval (sTTI), or other quantities that can be used to measure the length of time, which is not limited in the present disclosure. The following embodiments are mainly introduced by taking the subframe as an example but should not constitute any limitation to the embodiments of the present disclosure.

First Embodiment

The first control information includes a first bitmap, the first bitmap is used to determine the time domain resource of multiple transmissions of the sidelink, each bit in the first bitmap is corresponding to at least one time unit in the sidelink, and the value of each bit in the first bitmap is used to determine whether the time unit corresponding to each bit can be used for sidelink transmission.

Optionally, if the first bitmap includes P bits, where P is an integer greater than 1, and each bit corresponds to at least one time unit, the value of the bit can be used to determine whether the corresponding time unit can be used for the sidelink transmission. Thus, the terminal device can determine the time unit that can be used for the sidelink transmission among the time units corresponding to the P bits as the time unit for multiple transmissions of the sidelink, and further, the sidelink link data may be sent to other terminal devices multiple times in these time units, so that the reliability of the sidelink transmission can be improved.

For example, the first bitmap includes 8 bits, each bit corresponds to one subframe, and the 8 bits can be used to indicate whether the corresponding 8 subframes are available for sidelink transmission. Optionally, the 8 subframes may be 8 subframes starting from the current sidelink subframe receiving the first control information, where the highest bit corresponds to the current subframe, and so on. If the first bitmap is 10100101, it can be determined that the first, third, sixth, and eighth subframes starting from the current subframe can be used for sidelink transmission, so that the terminal device can send to other terminals on the above available subframes the sidelink data multiple times, thereby improving the reliability of data transmission.

It should be understood that in the embodiments of the present disclosure, after determining which subframes are used for sidelink transmission, the specific symbols in each subframe to transmit sidelink data may be determined according to the configuration of the resource pool, which is not specifically limited by the embodiments of the present disclosure. For example, if the first H symbols in one subframe are used to transmit PSCCH, and the remaining symbols are used to transmit PSSCH, the terminal device can transmit PSCCH on the first H symbols in the available subframe and transmit PSSCH on other symbols in the available subframes.

It should be noted that the time unit corresponding to each bit in the first bitmap may be with respect to the first time unit. Optionally, the first time unit may be the first time unit in a radio frame or the first time unit in a radio frame period; or the first time unit may also be a time unit pre-configured on the terminal device, or a time unit configured by a network device or other terminal. For example, the network device can configure the first time unit through DCI, and other terminals can configure the first time unit through SCI; or, the first time unit can be determined based on the second time unit that received the first control information.

It should be understood that, in the embodiments of the present disclosure, the subframe, the radio frame, or the radio frame period may refer to a downlink subframe, radio frame or radio frame period, or refer to a sidelink subframe, radio frame, or radio frame period.

For example, the second time unit may be a time unit on the sidelink through which the terminal device receives the first control information. In an implementation manner, the terminal device may determine the second time unit as the first time unit or may determine the $a^{th}$ sidelink time unit after the second time unit as the first time unit, and a is an integer greater than 1. Optionally, a may be 2, 4, 8, etc. For example, if the second time unit is a sidelink subframe n, the first time unit may be a sidelink subframe n+4. Among them, the parameter a may be pre-configured, or configured by the network, or indicated by other terminal through control signaling.

For another example, the second time unit may be a time unit on a downlink for the terminal device to receive the first control information. In an implementation manner, the terminal device may determine the second time unit as the first time unit or may determine the $b^{th}$ downlink time unit after the second time unit as the first time unit, and b is an integer greater than 1. Optionally, b may be 2, 4, 8, etc. For example, if the second time unit is a downlink subframe n, the first time unit may be a downlink subframe n+4. Among them, the parameter b may be pre-configured, or configured by the network, or indicated by other terminal through control signaling.

Second Embodiment

The first control information includes first configuration information, and the first configuration information is used to determine a time offset between two adjacent transmissions in the multiple transmissions.

Optionally, the first configuration information may directly indicate the time offset between two adjacent transmissions, or the first configuration information may also be an index value, and the corresponding time offset may be determined according to the index value and a pre-configured corresponding relationship between the index value and the time offset. The embodiments of the present disclosure do not limit the indication manner of the first configuration information.

Therefore, according to the first configuration information in the first control information, the terminal device can determine the time offset between two adjacent transmissions in multiple transmissions, and further, combined with the time domain resource corresponding to the first transmission and information about the transmission times, the time domain resource corresponding to each transmission in the multiple transmissions can be determined.

For example, if the first configuration information indicates that the time offset is 2 time units, and the number of transmissions is 4, then the time unit corresponding to the first transmission is 4, and the time unit 4 may be with respect to the third time unit. The way to determine the third time unit may refer to the aforementioned way to determine the first time unit, which will not be repeated here. If the third time unit is the current sidelink time unit that receives the first control information, the time units corresponding to four transmissions are the fourth, sixth, eighth, and tenth time units from the current time unit, respectively.

It should be understood that, in some implementation manners, the time offset between two adjacent transmissions may be determined by the first control information. In other implementation manners, the time offset may also be implicitly determined. Optionally, the time offset may be pre-configured on the terminal device or configured by a network device or other terminal. For example, the time offset may be Q, which is an integer greater than or equal to zero. That is, multiple transmissions may use adjacent time units, or time units spaced apart a fixed number of time units, or a fixed length of time.

Optionally, in some embodiments, the time domain resource corresponding to the first transmission may also be determined by the first control information, or, in other embodiments, the time domain resource corresponding to the first transmission resource may also be implicitly determined, for example, is pre-configured on the terminal device, or is configured by a network device or other terminal, which is not limited in the embodiments of the present disclosure.

In a specific implementation, seventh configuration information may be included in the first control information, and the seventh configuration information is used to determine the time domain resource corresponding to the first transmission. The indication manner of the seventh configuration information may be with reference to the first configuration information. Optionally, the seventh configuration information may also use the bitmap method described in the first embodiment to indicate the time domain resource corresponding to the first transmission, which is not repeated here. Alternatively, the seventh configuration information is a parameter c, which represents the time offset of the first transmission with respect to the reception of the first control information. If the first control information is received in a subframe n, the first transmission is determined to be a subframe n+c, and optionally, c may be 2, 4, 8, or the like.

Optionally, in some embodiments, the transmission times of the multiple transmissions may also be determined by the first control information, or in other embodiments, the transmission times of the multiple transmissions may also be implicitly determined. Optionally, the number of transmissions may be pre-configured on the terminal device, or configured by a network device or other terminal, which is not limited in the embodiments of the present disclosure. Optionally, the transmission times of the multiple transmissions may be default times, for example, twice or 4 times.

In a specific implementation, eighth configuration information may be included in the first control information, and the eighth configuration information is used to determine the number of transmissions of the multiple transmissions. For example, the eighth configuration information may directly indicate the number of transmissions of the multiple transmissions.

It should be understood that in the second embodiment, if the time offsets between two adjacent transmissions are the same, the first configuration information may only include one time offset, or if the time offsets between two adjacent transmissions in the multiple transmissions are different, the first configuration information may also include multiple time offsets, indicating the time offsets of two adjacent transmissions in sequence according to the sequence of transmission. For example, the number of transmissions is 4, the time offset between the first transmission and the second transmission is 2 time units, the time offset between the second transmission and the third transmission is 3 time units, and the time offset between the third transmission and the fourth transmission is 2 time units. The first configuration information may include three time offsets, which are 2, 3, and 2, respectively indicating the time offsets between two adjacent transmissions from the first transmission to the fourth transmission.

Third Embodiment

The first control information includes first index information, and the first index information is used to indicate time domain resource information corresponding to each of the multiple transmissions.

In the third embodiment, the terminal device is configured with a first corresponding relationship. Optionally, the first corresponding relationship may be pre-configured or configured by a network device or other terminal. The first corresponding relationship is a corresponding relationship between the index value and the time domain resource, so that the terminal device can determine the time domain resources used for multiple transmissions of the sidelink according to the first index information included in the first control information in combination with the first corresponding relationship.

As an example, and not a limitation, the first corresponding relationship may be as shown in Table 1.

TABLE 1

| Index value | Subframe sequence number |
| --- | --- |
| 0 | 1 |
| 1 | 2 |
| 2 | 3 |
| 3 | 4 |
| 4 | 1, 2 |
| 5 | 1, 3 |
| 6 | 1, 4 |
| 7 | 2, 4 |
| 8 | 1, 2, 3, 4 |
| 9 | 5, 6, 7, 8 |
| 10 | 1, 3, 5, 7 |
| 11 | 2, 4, 6, 8 |
| 12 | 1, 3, 5, 7, 9, 11, 13, 15 |
| 13 | 2, 4, 6, 8, 10, 12, 14, 16 |
| 14 | 1, 2, 3, 4, 5, 6, 7, 8 |
| 15 | 9, 10, 11, 12, 13, 14, 15, 16 |

Optionally, in the third embodiment, the number of transmissions of the multiple transmissions may be determined by other parameters or information in the first control information, or may be pre-configured or configured by the network, or in a possible implementation manner, the number of transmissions of the multiple transmissions may be determined by the first index information, and then the time domain resource corresponding to the first index information is the time unit corresponding to the multiple transmissions.

For example, if the first index information is 8, it can be obtained by looking up Table 1 that the first index information corresponds to the subframe sequence numbers 1, 2, 3, 4, and the index 8 indicates 4 transmissions. The subframe sequence number may be with respect to a specific time unit. The method for determining the specific time unit may refer to the first time unit in the first embodiment. Taking the specific time unit as the current side uplink subframe receiving the first control information as an example, the subframes corresponding to the 4 transmissions are the first, second, third, and fourth subframes from the current subframe. If the first index information is 12, it can be seen from Table 1 that index 12 corresponds to 8 transmissions, and the subframes corresponding to the 8 transmissions are the first, third, fifth, seventh, ninth and eleventh, thirteenth and fifteenth subframes from the current subframe.

Fourth Embodiment

The first control information includes second configuration information, and the second configuration information is used to determine a time offset of each of the multiple transmissions with respect to a specific boundary. For example, the second configuration information may directly indicate the time offset of each transmission with respect to the specific boundary or the number of the offset time units, or the second configuration information may also be multiple index values, and each index value is used to indicate the time offset of the corresponding one transmission with respect to the specific boundary or the index of the time unit. The embodiments of the present disclosure do not specifically limit the indication manner of the second configuration information.

Further, the terminal device may use the specific boundary as a reference and combine the time offset of each transmission with respect to the specific boundary to determine the time domain resource corresponding to each transmission.

It should be noted that the method for determining the specific boundary may refer to the first time unit in the first embodiment, which will not be repeated here. In the following, the description is given by using the specific boundary as the current subframe carrying the first control information for an example.

If the time offset is represented by 5 bits, the maximum time offset that can be indicated is 32 subframes. If the number of transmissions is 2, the method for determining the number of transmissions may refer to the second embodiment. If the time offsets corresponding to the two transmissions are respectively 00010 and 00100, it can indicate that the time domain resources corresponding to the two transmissions are the second subframe and the fourth subframe from the current subframe, respectively.

Optionally, the first control information may also include first indication information for indicating the type information of the time domain resources used for the multiple transmissions, for example, whether the time domains are adjacent. If the time domains are adjacent, the terminal device can also determine the time domain resource of each transmission according to the location of the time domain resource of the first transmission.

It should be understood that the above methods for determining the time domain resources for multiple transmissions of the sidelink are only examples and should not constitute any limitation to the embodiments of the present disclosure. The above embodiments may be used alone or in combination. For example, it is possible to determine the location of the time domain resource for the first transmission according to the fourth embodiment and then determine the time domain resources used for several subsequent transmissions in combination with the second embodiment or the first embodiment.

In summary, the time domain resource information corresponding to the first transmission, the time offset of two adjacent transmissions, the number of transmissions, the time offset of each transmission with respect to the specific boundary, and other information can all be determined by the first control information, or part of the above information may be determined by the first control information, and other information may be implicitly determined, for example, it may be pre-configured information or information configured by the network.

It should be understood that information such as the time domain resource information corresponding to the first transmission, the time offset of two adjacent transmissions, the number of transmissions, and the time offset of each transmission with respect to the specific boundary can be determined based on the same DCI, or can be determined according to different DCIs, which is not limited in the embodiments of the present disclosure. For example, the time domain resource information corresponding to the first transmission can be determined according to the first DCI, and the time offset between two adjacent transmissions can be determined according to the second DCI, and so on.

2. A Method for Determining the Frequency Domain Resources for Multiple Transmissions of the Sidelink It should be understood that in the embodiments of the present disclosure, the unit of the frequency domain resources may be called a frequency domain unit, and one frequency domain unit may be a physical resource block (PRB), a Resource Block Group (RBG), a subband, or other fixed frequency domain length, which is not limited in the embodiments of the present disclosure. The RBG and the subband include multiple consecutive PRBs. The following embodiments mainly take the subband as an example for introduction but should not constitute any limitation to the embodiments of the present disclosure.

Fifth Embodiment

The first control information includes a second bitmap, the second bitmap is used to determine the frequency domain resources of multiple transmissions of the sidelink, each bit in the second bitmap is corresponding to at least one frequency domain unit in a system second bitmap, and the value of each bit in the second bitmap is used to determine whether the frequency domain unit corresponding to each bit can be used for sidelink transmission.

Optionally, if the second bitmap includes L bits, and each bit corresponds to at least one frequency domain unit, the value of the bit can be used to determine whether the corresponding frequency domain unit can be used for sidelink transmission. Thus, the terminal device may determine the frequency domain unit that can be used for sidelink transmission among the frequency domain units corresponding to the L bits as the frequency domain unit used for multiple transmissions of the sidelink and may further receive multiple transmissions sent by other terminal devices in these frequency domain units, thereby improving the reliability of sidelink transmission.

For example, the second bitmap includes 10 bits, and each bit corresponds to one subband. The 10 bits can indicate whether the corresponding 10 subbands (subband 0~subband 9) can be used for sidelink transmission, where the lowest bit corresponds to the lowest subband index. If the second bitmap is 1010101010, it can be determined that the subband 1, subband 3, subband 5, subband 7, and subband 9 can be used for sidelink transmission. Therefore, the terminal device may receive sidelink data sent multiple times by other terminal devices on the above-mentioned available subbands.

It should be understood that, in the embodiments of the present disclosure, after determining which subbands are used to perform sidelink transmission, the specific PRBs in each subband on which sidelink data is transmitted may be determined according to the configuration of the resource pool. For example, if the first K PRBs in one subband are used to transmit PSCCH and the remaining PRBs are used to transmit PSSCH, then the terminal device may transmit PSCCH on the first K PRBs in the available subband and transmit PSSCH on other PRBs in the available subband, where K is an integer greater than or equal to 1.

Sixth Embodiment

The first control information includes third configuration information, and the third configuration information is used to determine frequency domain resource length information for each of multiple transmissions of the sidelink.

Similar to the aforementioned first configuration information, the third configuration information may also directly indicate the frequency domain resource length corresponding to each transmission, or the third configuration information may also be multiple index values, and the multiple index values indicate the frequency domain resource length of the multiple transmissions, which is not specifically limited in the embodiments of the present disclosure.

Optionally, in the embodiments of the present disclosure, the frequency domain resource length information for each transmission may also be implicitly configured. For example, the frequency domain resource length corresponding to each transmission may be a default length, for example, one subband or two subbands, etc., or the frequency domain resource length may be pre-configured on the terminal device or may be a frequency domain length configured by the network device or other terminal, which is not limited in the embodiments of the present disclosure.

Further, the terminal device may determine the frequency domain resource corresponding to each transmission according to the frequency domain resource length corresponding to each transmission in the multiple transmissions in combination with the frequency domain start position corresponding to each transmission. In the following, combining the first method and the second method, the method for determining the frequency domain start position of each transmission is introduced.

First Method:

The first control information includes fourth configuration information, and the fourth configuration information is used to determine the frequency domain start position of each of the multiple transmissions.

That is, by carrying the fourth configuration information in the first control information, the terminal device can determine the frequency domain start position corresponding to each transmission according to the fourth configuration information.

Optionally, the fourth configuration information may be used to indicate an index of the starting frequency domain unit corresponding to each transmission. For example, if the system is divided into 10 subbands, 4-bit information may be used to indicate one subband index (0~9). When the number of transmissions is 2, the frequency domain start position of each transmission may be indicated by two 4-bits. If the 4-bit information is 0010 and 0110, respectively, it can be determined that subband 2 and subband 6 correspond to the frequency domain start positions of the two transmissions.

Further, the terminal device determines the frequency domain resource of each transmission in the multiple transmissions according to the frequency domain start position of each transmission in the multiple transmissions and the frequency domain resource length information.

Following the above example, if the frequency domain resource length of the first transmission is 2 subbands and the frequency domain resource length of the second transmission is 1 subband, the terminal device can perform the first time of transmission on subband 2 and subband 3, and perform the second transmission on the subband 6, or the terminal device may perform the first transmission on the subband 6 and the subband 7 and perform the second transmission on the subband 2.

Optionally, the first control information may also include a first parameter, which is used to indicate that the lowest frequency domain start position (or the lowest frequency domain unit, which can be understood as the frequency domain unit with the smallest subband index value) corresponds to the $m^{th}$ transmission in multiple transmissions, $1 \leq m \leq M$, where M is the total number of transmissions, and other M−1 transmissions in the multiple transmissions can also be determined in sequence.

Following the above example, if the first parameter indicates that subband 2 corresponds to the second transmission, then the subband 6 corresponds to the first transmission, that is, the frequency domain start position of the first transmission is subband 6, and the frequency domain start position of the second transmission is subband 2, so that the terminal device can perform the first transmission on subband 6 and subband 7 and perform the second transmission on subband 2.

Optionally, in some embodiments, the first parameter may also be used to indicate which of the multiple transmissions the highest frequency domain start position corresponds to, or it may indicate any of frequency domain start position corresponds to which of the multiple transmissions. The specific implementations are similar, which are not repeated here.

Second Method:

The first control information includes a third bitmap, each bit in the third bitmap corresponds to at least one frequency domain unit in the system, the number of bits that take the first value in the third bitmap is used to determine the number of transmissions of the multiple transmissions, and the frequency domain unit corresponding to the bit of the first value in the third bitmap is used to determine the frequency domain start position of each transmission in the multiple transmissions.

Optionally, the first value may be 0 or 1, and the first value is 1 as an example for description.

For example, if the system bandwidth is 20 MHz using subband as the unit, each subband includes 10 PRBs, and there are 10 subbands corresponding to 10 bits of the third bitmap, respectively. If the third bitmap is 00 0010 0100, where the lowest bit corresponds to the lowest subband index, and the number of bits with a value of 1 is 2, then it can be determined that the number of transmissions is 2, and the corresponding frequency domain start positions are subband 2 and subband 5.

Since the bit order in the third bitmap is arranged in an order of subband index from low to high, this limits that the frequency domain start positions of multiple transmissions are also in the order of subband index from low to high. To improve the flexibility of sidelink transmission, the first control information may also include a second parameter, which is used to indicate that the lowest frequency domain start position (or the lowest frequency domain unit, which can be understood as the frequency domain unit with the smallest index value) corresponds to the $k^{th}$ transmission in multiple transmissions, $1 \leq k \leq M$, where M is the total number of transmissions, and the other M−1 transmissions in the multiple transmissions can be determined in sequence.

In the previous example, the second parameter may be 1 bit. It is assumed that the second parameter being 0 means that the lowest subband corresponds to the first transmission, and the second parameter being 1 means that the lowest subband corresponds to the second transmission. If the second parameter is 1, it can be determined that the second transmission starts from subband 2, and the first transmission starts from subband 6. Or, if the third bitmap is 0010101010, that is, the number of transmissions is 4, then the frequency domain start positions are subband 1, subband 3, subband 5, and subband 7. In this case, the second parameter may be 2 bits, and the value of 00~11 indicates that the lowest subband corresponds to the first transmission to the fourth transmission. If the second parameter is 10, it means that the lowest subband corresponds to the third transmission, then it can be determined that the frequency domain start positions corresponding to the four transmissions are subband 5, subband 7, subband 1, and subband 3.

Seventh Embodiment

The first control information includes fifth configuration information, and the fifth configuration information is used to determine an offset of the frequency domain start positions of two adjacent transmissions in the multiple transmissions. Optionally, the fifth configuration information may directly indicate the offset of the frequency domain start positions between two adjacent transmissions, or the first configuration information may also be an index value, and the corresponding frequency domain offset may be determined according to the index value and the pre-configured corresponding relationship between the index value and the frequency domain offset. The embodiments of the present disclosure do not limit the indication manner of the fifth configuration information.

Therefore, according to the fifth configuration information in the first control information, the terminal device can determine the offset of the frequency domain start positions between two adjacent transmissions in multiple transmissions, and further, combined with the frequency domain start position corresponding to the first transmission, the number of transmissions of the multiple transmissions, and the frequency domain resource length of each transmission, the frequency domain resource corresponding to each transmission in the multiple transmissions can be determined.

For example, if the fifth configuration information indicates that the frequency domain offset is 4 subbands, the number of transmissions is 4, the frequency domain start position corresponding to the first transmission is subband 2, and the frequency domain length is 2 subbands, then the frequency domain start positions corresponding to four transmissions are subband 2, subband 6, subband 10, and subband 14, and each transmission occupies 2 subbands.

Optionally, the frequency domain start position corresponding to the first transmission may be determined by the first control information, or the frequency domain start position corresponding to the first transmission may also be implicitly determined, for example, it is pre-configured on the terminal device, or configured by a network device or other terminal, or determined according to the receiving resource of the first control information, which is not limited in the embodiments of the present disclosure. For specific implementation, the indication manner of the seventh configuration information in the foregoing embodiment is referred to, and details are not described here.

It should be noted that in the seventh embodiment, if the frequency domain offsets of the frequency domain start positions of two adjacent transmissions are the same, the fifth configuration information may include only one frequency domain offset, or if the frequency domain offsets of two adjacent transmissions in multiple transmissions are different, the fifth configuration information may also include multiple frequency domain offsets, indicating the offsets of the frequency domain start positions of the two adjacent transmissions in sequence according to the order of transmission. For example, the number of transmissions is 4, the offset of the frequency domain start positions of the first transmission and the second transmission is 2 subbands, the offset of the frequency domain start positions of the second transmission and the third transmission is 3 frequency domain offsets, the offset of the frequency domain start positions of the third transmission, and the fourth transmission is 2 subbands. The fifth configuration information may include three frequency domain offsets, respectively 2, 3, and 2, which respectively indicate the offsets of the frequency domain start positions between two adjacent transmissions from the first transmission to the fourth transmission.

Eighth Embodiment

The first control information includes sixth configuration information, and the sixth configuration information includes N Resource Indication Values (RIVs), and the N RIVs are used to determine the frequency domain start positions and/or frequency domain lengths of the multiple transmissions.

For example, the RIV value may correspond to the start PRB index (n_PRB_start) of one transmission and the number of consecutive PRBs (L_PRB). As an example, and not a limitation, the RIV may be determined according to the following formula:

If $L\_PRB-1 \leq [N\_PRB/2]$, then:

$RIV = N\_PRB*(L\_PRB-1)+n\_PRB\_start$;

Otherwise, $RIV = N\_PRB*(N\_PRB-L\_PRB+1)+(N\_PRB-n\_PRB\_start-1)$.

Among them, N_PRB represents the total number of PRBs in the resource pool.

Optionally, in some embodiments, the first control information includes one RIV value, and the RIV value is used to indicate the frequency domain start position and the frequency domain resource length of the first transmission.

In this case, the first control information also includes ninth configuration information, which is used to determine the frequency domain start position of multiple transmissions. For example, the ninth configuration information may be the offset of the frequency domain start position of two adjacent transmissions, or the frequency domain start position of other M−1 transmissions other than the first transmission, etc., for the specific indication method, the relevant description of the foregoing embodiments may be referred to, which will not be repeated here.

Based on the above embodiments, the frequency domain start position corresponding to the first transmission, the offset of the frequency domain start positions in the two adjacent transmissions, the frequency domain resource length, the number of transmissions, and other information can all be determined by the first control information, or part of the information may be determined by the first control information, and other information may be determined implicitly, for example, other information may be pre-configured information or information configured by network, or determined by other control information.

It should also be understood that the frequency domain start position corresponding to the first transmission, the offset of the frequency domain start positions in the two adjacent transmissions, the frequency domain resource length, the number of transmissions and other information can be determined based on the same DCI, or may be determined according to different DCIs, which is not limited in the embodiments of the present disclosure. For example, the frequency domain start position may be determined according to the third DCI, the length of the frequency domain resource may be determined according to the fourth DCI, and so on.

It should be understood that the above method for determining frequency domain resources for multiple transmissions of the sidelink is only an example and should not constitute any limitation to the embodiments of the present disclosure. The above embodiments can be used alone or in combination, which is not specially limited by the embodiments of the present disclosure.

The method embodiments of the present disclosure are described in detail above with reference to FIG. 2, and the apparatus embodiments of the present disclosure are described below in conjunction with FIG. 3 to FIG. 5. It should be understood that the apparatus embodiments and the method embodiments correspond to each other, and similar descriptions can be referred to as method embodiments.

Figure 3:
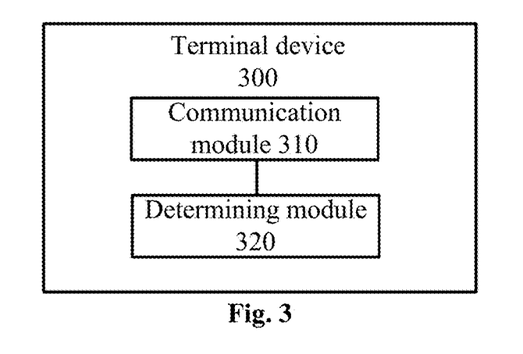
FIG. 3 is a schematic block diagram of a terminal device according to an embodiment of the present disclosure.

FIG. 3 is a schematic structural diagram of a terminal device according to an embodiment of the present disclosure. As shown in FIG. 3, the terminal device 300 includes a communication module 310, used to receive first control information sent by a network device, where the first control information is used to determine resource information used for multiple transmissions of the sidelink; and a determining module 320, used to determine a resource used for multiple transmissions of the sidelink according to the first control information.

Optionally, in some embodiments, the resource information used for multiple transmissions of the sidelink includes time domain resource information and/or frequency domain resource information used for the multiple transmissions of the sidelink.

Optionally, in some embodiments, the first control information includes a first bitmap, and the first bitmap is used to determine a time domain resource for multiple transmissions of the sidelink, and each bit in the first bitmap corresponds to at least one time unit in the system, and the value of each bit in the first bitmap is used to determine whether the time unit corresponding to each bit can be used in the sidelink transmission. The determining module 320 is further used to determine a time unit that can be used for sidelink transmission in the time unit corresponding to each bit of the first bitmap as the time domain resource used for multiple transmissions of the sidelink.

Optionally, in some embodiments, the first control information includes first configuration information, and the first configuration information is used to determine the time offset between two adjacent transmissions in the multiple transmissions. The determining module 320 is further used to, according to the time domain resource information of the first transmission in the multiple transmissions, the number of transmissions of the multiple transmissions, and the time offset between two adjacent transmissions, determine the time domain resource used for each transmission in the multiple transmissions.

Optionally, in some embodiments, the time domain resource information of the first transmission is determined according to the first control information, or pre-configured on the terminal device, or configured by a network device; the information about the number of transmissions is determined according to the first control information, or is pre-configured on the terminal device, or configured by a network device.

Optionally, in some embodiments, the first control information includes first index information, and the first index information is used to indicate time domain resource information corresponding to each of the multiple transmissions.

Optionally, in some embodiments, the determining module 320 is further used to determine the time domain resource used for the multiple transmissions according to the first index information and the first corresponding relationship, where the first corresponding relationship is a corresponding relationship between the index information and the time domain resource information.

Optionally, in some embodiments, the determining module 320 is further used to determine the number of transmissions of the multiple transmissions according to the first index information, the time domain resource corresponding to the first index information being a time unit used for the multiple transmissions.

Optionally, in some embodiments, the first control information includes second configuration information, and the second configuration information is used to determine the time offset information of each of the multiple transmissions with respect to a specific boundary. The determining module 320 is also used to, based on the specific boundary, determine the time domain resource used for each transmission according to the time offset of each transmission with respect to the specific boundary.

Optionally, in some embodiments, the specific boundary is a time unit determined according to a time unit carrying the first control information, or the first time unit of the current radio frame, or the first time unit of the current radio frame period.

Optionally, in some embodiments, the first control information includes a second bitmap, and the second bitmap is used to determine the frequency domain resources for multiple transmissions of the sidelink. Each bit in the second bitmap corresponds to at least one frequency domain unit in the system, and the value of each bit in the second bitmap is used to determine whether the frequency domain unit corresponding to each bit can be used for sidelink transmission.

Optionally, in some embodiments, the determining module 320 is further used to determine a frequency domain unit that can be used for sidelink transmission among the frequency domain units corresponding to individual bits of the second bitmap as a frequency domain resource used for multiple transmissions of the sidelink.

Optionally, in some embodiments, the first control information includes third configuration information, and the third configuration information is used to determine the frequency domain resource length information of each of the multiple transmissions of the sidelink.

Optionally, in some embodiments, the first control information includes fourth configuration information, and the fourth configuration information is used to determine the frequency domain start position of each of the multiple transmissions. The determining module 320 is further used to determine the frequency domain resource length information of each of the multiple transmissions of the sidelink according to the third configuration information, and determine the frequency domain start position of each of the multiple transmissions according to the fourth configuration information; determine the frequency domain resource of each transmission in the multiple transmissions according to the frequency domain start position and the frequency domain resource length information of each transmission in the multiple transmissions.

Optionally, in some embodiments, the first control information includes a third bitmap, and each bit in the third bitmap corresponds to at least one frequency domain unit in the system. The number of bits with the first value in the third bitmap is used to determine the number of transmissions of the multiple transmissions, and the frequency domain unit corresponding to the bits with the first value in the third bitmap is used to determine the frequency domain start position of each transmission in the multiple transmissions.

Optionally, in some embodiments, the determining module 320 is further used to determine, according to the third configuration information, frequency domain resource length information for each of the multiple transmissions of the sidelink; determine the number of bits that take the first value in the third bitmap as the number of transmissions for the multiple transmissions, and determine the frequency domain unit corresponding to the bit that takes the first value in the third bitmap as the frequency domain start position of each transmission in the multiple transmissions; determine the frequency domain resources of each transmission in the multiple transmissions according to the transmission times of the multiple transmissions, the frequency domain start position and the frequency domain resource length information of each transmission in the multiple transmissions.

Optionally, in some embodiments, the first control information includes fifth configuration information, and the fifth configuration information is used for determining the frequency domain start position of two adjacent transmissions in the multiple transmissions. The determining module 320 is further used to determine the frequency domain resource for each transmission in multiple transmissions according to the frequency domain start position of the first transmission in the multiple transmissions, the number of transmissions of the multiple transmissions, and the offset of the frequency domain start positions of the two adjacent transmissions.

Optionally, in some embodiments, the frequency domain start position of the first transmission is determined according to the first control information, or is pre-configured on the terminal device, or is configured by a network device; or the information about the number of transmissions is determined according to the first control information, or is pre-configured on the terminal device, or is configured by a network device.

Optionally, in some embodiments, the first control information includes sixth configuration information, and the sixth configuration information includes N resource indicator values RIVs, and the N RIVs are used to determine the frequency domain start position and/or the frequency domain length of the multiple transmission, and the determining module 320 is further used to determine the frequency domain resource for the multiple transmissions according to the N resource indicator values, where N is the total number of the multiple transmissions.

Optionally, in some embodiments, the first control information is downlink control information (DCI), and the sidelink includes a sidelink control channel (PSCCH) and/or a sidelink shared channel (PSSCH).

Figure 4:
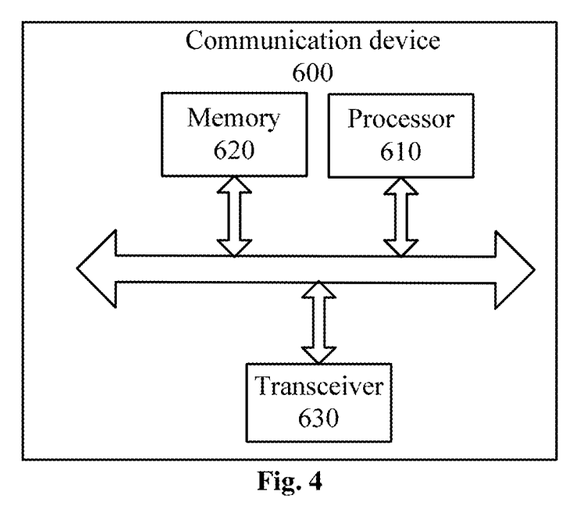
FIG. 4 is a schematic block diagram of a terminal device according to another embodiment of the present disclosure.

FIG. 4 is a schematic structural diagram of a communication device 600 provided by an embodiment of the present disclosure. The communication device 600 shown in FIG. 4 includes a processor 610, and the processor 610 can call and run a computer program from a memory to implement the method in the embodiments of the present disclosure.

Optionally, as shown in FIG. 4, the communication device 600 may further include a memory 620. The processor 610 may call and run a computer program from the memory 620 to implement the method in the embodiments of the present disclosure.

The memory 620 may be a separate device independent of the processor 610 or may be integrated in the processor 610.

Optionally, as shown in FIG. 4, the communication device 600 may further include a transceiver 630, and the processor 610 may control the transceiver 630 to communicate with other devices. Specifically, it may send information or data to other devices, or receive information or data sent by other devices.

The transceiver 630 may include a transmitter and a receiver. The transceiver 630 may further include an antenna, and the number of antennas may be one or more.

Optionally, the communication device 600 may specifically be the mobile terminal/terminal device of the embodiments of the present disclosure, and the communication device 600 may implement the corresponding processes implemented by the mobile terminal/terminal device in each method of the embodiments of the present disclosure. For the sake of brevity, details will not be repeated here.

Figure 5:
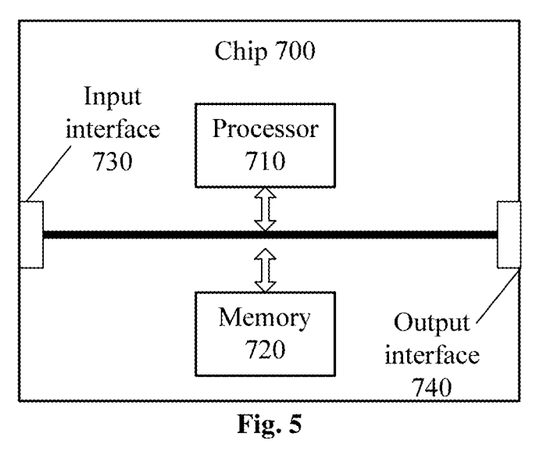
FIG. 5 is a schematic block diagram of a chip provided by an embodiment of the present disclosure.

FIG. 5 is a schematic structural diagram of a chip according to an embodiment of the present disclosure. The chip 700 shown in FIG. 5 includes a processor 710, and the processor 710 can call and run a computer program from the memory to implement the method in the embodiments of the present disclosure.

Optionally, as shown in FIG. 5, the chip 700 may further include a memory 720. The processor 710 may call and run a computer program from the memory 720 to implement the method in the embodiments of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 can control the output interface 740 to communicate with other devices or chips, and specifically, can output information or data to other devices or chips.

Optionally, the chip can be applied to the mobile terminal/terminal device in the embodiments of the present disclosure, and the chip can implement the corresponding process implemented by the mobile terminal/terminal device in each method of the embodiments of the present disclosure. For brevity, details will not be repeated here.

It should be understood that the chip mentioned in the embodiments of the present disclosure may also be referred to as a system-level chip, a system chip, a chip system, or a system-on-chip, etc.

It should be understood that the processor of the embodiments of the present disclosure may be an integrated circuit chip with signal processing capability. In the implementation process, each step of the foregoing method embodiments may be completed by an integrated logic circuit of hardware in a processor or instructions in the form of software. The above processor may be a general-purpose processor, a Digital Signal Processor (DSP), an Application Specific Integrated Circuit (ASIC), a Field Programmable Gate Array (FPGA), or other programmable logic devices, discrete gates or transistor logic devices and discrete hardware components. The methods, steps, and logical block diagrams disclosed in the embodiments of the present disclosure may be implemented or executed. The general purpose processor may be a microprocessor or the processor or any conventional processor or the like. The steps of the method disclosed in the embodiments of the present disclosure may be directly implemented by the hardware decoding processor, or may be performed by a combination of hardware and software modules in the decoding processor. The software module may be located in a mature storage medium in the art, such as a random access memory, a flash memory, a read only memory, a programmable read only memory or an electrically erasable programmable memory, a register, and the like. The storage medium is located in the memory, and the processor reads the information in the memory and completes the steps of the above method in combination with its hardware.

It is to be understood that the memory in the embodiments of the present disclosure may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and Direct Rambus RAM (DR RAM). It should be noted that the memories of the systems and methods described herein are intended to include, but not limited to, these and any other suitable types of memory.

It should be understood that the foregoing memory is exemplary but not restrictive. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is to say, the memory in the embodiments of the present disclosure is intended to include but not limited to these and any other suitable types of memory.

The embodiment of the present disclosure also provides a computer-readable storage medium for storing computer programs.

Optionally, the computer-readable storage medium may be applied to the network device in the embodiments of the present disclosure, and the computer program causes the computer to execute the corresponding process implemented by the network device in each method of the embodiments of the present disclosure. For brevity, details will not be repeated here.

Optionally, the computer-readable storage medium may be applied to the mobile terminal/terminal device in the embodiments of the present disclosure, and the computer program causes the computer to execute the corresponding process implemented by the mobile terminal/terminal device in each method of the embodiments of the present disclosure. For brevity, details will not be repeated here.

The embodiments of the present disclosure also provide a computer program product, including computer program instructions.

Optionally, the computer program product may be applied to the network device in the embodiments of the present disclosure, and the computer program instructions cause the computer to execute the corresponding process implemented by the network device in each method of the embodiments of the present disclosure. For brevity, details will not be repeated here.

Optionally, the computer program product may be applied to the terminal device in the embodiments of the present disclosure, and the computer program instructions cause the computer to execute the corresponding process implemented by the mobile terminal/terminal device in each method of the embodiments of the present disclosure. For brevity, details will not be repeated here.

The embodiment of the present disclosure also provides a computer program.

Optionally, the computer program may be applied to the network device in the embodiments of the present disclosure. When the computer program runs on the computer, the computer is caused to execute the corresponding process implemented by the network device in each method of the embodiments of the present disclosure. For brevity, details will not be repeated here.

Optionally, the computer program may be applied to the mobile terminal/terminal device in the embodiments of the present disclosure. When the computer program runs on the computer, it causes the computer to execute the corresponding process implemented by the mobile terminal/terminal device in each method of the embodiments of the present disclosure. For brevity, details will not be repeated here.

Those of ordinary skill in the art will appreciate that the unit and algorithm steps of the various examples described in connection with the embodiments disclosed herein may be implemented in electronic hardware or a combination of computer software and electronic hardware. Whether these functions are performed in hardware or software depends on the specific application and design constraints of the solution. A person skilled in the art may use different methods to implement the described functions for each particular application, but such implementation should not be considered to be beyond the scope of the present disclosure.

A person skilled in the art may clearly understand that for the convenience and brevity of the description, the specific working process of the system, the apparatus and the unit described above may refer to the corresponding process in the foregoing method embodiments, and details are not repeated herein again.

In the several embodiments provided by the present disclosure, it should be understood that the disclosed systems, apparatuses, and methods may be implemented in other manners. For example, the apparatus embodiments described above are merely illustrative. For example, the division of the unit is only a logical function division. In actual implementation, there may be another division manner, for example, a plurality of units or components may be combined or may be integrated into another system, or some features may be ignored or not executed. In addition, the mutual coupling or direct coupling or communication connection shown or discussed may be an indirect coupling or communication connection through some interfaces, apparatuses or units, and may be in an electrical, mechanical or other form.

The units described as separate components may or may not be physically separated, and the components displayed as units may or may not be physical units, that is, may be located in one place, or may be distributed to a plurality of network units. Some or all of the units may be selected according to actual needs to achieve the purpose of the solutions of the embodiments.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the essence of the technical solutions of the embodiments of the present disclosure, or the part contributing to the prior art, may be embodied in the form of a software product which is stored in a storage medium including a number of instructions such that a computer device (which may be a personal computer, a server, or a network device, etc.) performs all or part of the method described in each of the embodiments of the present disclosure. The aforementioned storage media include: a U disk, a mobile hard disk, a Read-Only Memory (ROM), a Random Access Memory (RAM), a magnetic disk or an optical disk and other media that can store program codes.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for transmitting data, comprising:
receiving, by a terminal device, first control information sent by a network device, wherein the first control information is used to determine resource information used for multiple transmissions of a sidelink; and
determining, by the terminal device, a resource used for the multiple transmissions of the sidelink according to the first control information,
wherein the resource information used for the multiple transmissions of the sidelink comprises at least one of time domain resource information or frequency domain resource information used for the multiple transmissions of the sidelink; and
wherein the first control information comprises first index information, and the first index information is used to indicate the time domain resource information corresponding to each of the multiple transmissions.

2. The method according to claim 1, wherein the first control information comprises first configuration information, the first configuration information is used to determine a time offset between two adjacent transmissions in the multiple transmissions, and the determining, by the terminal device, the resource used for the multiple transmissions of the sidelink according to the first control information comprises:
determining, by the terminal device, a time domain resource used for each of the multiple transmissions according to the time domain resource information of a first transmission in the multiple transmissions, a number of transmissions of the multiple transmissions, and the time offset between two adjacent transmissions.

3. The method according to claim 2, wherein
the time domain resource information of the first transmission is determined according to the first control information, or is pre-configured on the terminal device, or is configured by the network device; and
the number of transmissions is determined according to the first control information, or is pre-configured on the terminal device, or is configured by the network device.

4. The method according to claim 1, wherein the determining, by the terminal device, the resource used for the multiple transmissions of the sidelink according to the first control information comprises:
determining, by the terminal device, a time domain resource used for the multiple transmissions according to the first index information and a first corresponding relationship, wherein the first corresponding relationship is a corresponding relationship between index information and the time domain resource information.

5. The method according to claim 4, further comprising:
determining, by the terminal device, a number of transmissions of the multiple transmissions according to the first index information, and the time domain resource corresponding to the first index information is a time unit used for the multiple transmissions.

6. The method according to claim 1, wherein the first control information comprises second configuration information, the second configuration information is used to determine time offset information of each of the multiple transmissions with respect to a specific boundary, and the determining, by the terminal device, the resource used for the multiple transmissions of the sidelink according to the first control information comprises:
determining, by the terminal device, a time domain resource used for each of the transmissions using the specific boundary as a reference according to a time offset of each of the transmissions with respect to the specific boundary.

7. The method according to claim 6, wherein the specific boundary is a time unit determined according to a time unit carrying the first control information, or the first time unit of a current radio frame, or the first time unit of a current radio frame period.

8. The method according to claim 1, wherein the first control information comprises a second bitmap, the second bitmap is used to determine a frequency domain resource of the multiple transmissions of the sidelink, each bit in the second bitmap corresponds to at least one frequency domain unit in a system, and a value of each bit in the second bitmap is used to determine whether the frequency domain unit corresponding to each bit can be used for sidelink transmission.

9. The method according to claim 1, wherein the first control information comprises third configuration information, and the third configuration information is used to determine frequency domain resource length information of each of the multiple transmissions of the sidelink.

10. The method according to claim 9, wherein the frequency domain resource length information of each of the multiple transmissions is pre-configured on the terminal device.

11. The method according to claim 9, wherein the first control information comprises fourth configuration information, the fourth configuration information is used to determine a frequency domain start position of each of the multiple transmissions, and the determining, by the terminal device, the resource used for the multiple transmissions of the sidelink according to the first control information comprises:
determining, by the terminal device, the frequency domain resource length information of each of the multiple transmissions of the sidelink according to the third configuration information, and determining the frequency domain start position of each of the multiple transmissions according to the fourth configuration information; and
determining, by the terminal device, a frequency domain resource of each of the multiple transmissions according to the frequency domain start position and the frequency domain resource length information of each of the multiple transmissions.

12. The method according to claim 1, wherein the first control information is downlink control information (DCI), and the sidelink comprises at least one of a sidelink control channel (PSCCH) or a sidelink shared channel (PSSCH).

13. A terminal device, comprising:
a processor; and
a memory storing a computer program,
wherein the processor is configured to call and run the computer program stored in the memory, and execute:
receiving first control information sent by a network device, wherein the first control information is used to determine resource information used for multiple transmissions of a sidelink; and
determining a resource used for the multiple transmissions of the sidelink according to the first control information;

wherein the resource information used for the multiple transmissions of the sidelink comprises at least one of time domain resource information or frequency domain resource information used for the multiple transmissions of the sidelink; and wherein the first control information comprises first index information, and the first index information is used to indicate the time domain resource information corresponding to each of the multiple transmissions.

14. The terminal device according to claim 13, wherein the first control information comprises first configuration information, the first configuration information is used to determine a time offset between two adjacent transmissions in the multiple transmissions, and the processor is further configured to:

determine a time domain resource used for each of the multiple transmissions according to the time domain resource information of a first transmission in the multiple transmissions, a number of transmissions of the multiple transmissions, and the time offset between two adjacent transmissions.

15. The terminal device according to claim 14, wherein the time domain resource information of the first transmission is determined according to the first control information, or is pre-configured on the terminal device, or is configured by the network device; and the number of transmissions is determined according to the first control information, or is pre-configured on the terminal device, or is configured by the network device.

16. The terminal device according to claim 13, wherein the processor is further configured to:

determine a time domain resource used for the multiple transmissions according to the first index information and a first corresponding relationship, wherein the first corresponding relationship is a corresponding relationship between index information and the time domain resource information.

17. The terminal device according to claim 16, wherein the processor is further configured to:

determine a number of transmissions of the multiple transmissions according to the first index information, and the time domain resource corresponding to the first index information is a time unit used for the multiple transmissions.

18. The terminal device according to claim 13, wherein the first control information comprises second configuration information, the second configuration information is used to determine time offset information of each of the multiple transmissions with respect to a specific boundary, and the processor is further configured to:

determine a time domain resource used for each of the transmissions using the specific boundary as a reference according to a time offset of each of the transmissions with respect to the specific boundary.

19. The terminal device according to claim 18, wherein the specific boundary is a time unit determined according to a time unit carrying the first control information, or the first time unit of a current radio frame, or the first time unit of a current radio frame period.

20. The terminal device according to claim 13, wherein the first control information comprises a second bitmap, the second bitmap is used to determine a frequency domain resource of the multiple transmissions of the sidelink, each bit in the second bitmap corresponds to at least one frequency domain unit in a system, and a value of each bit in the second bitmap is used to determine whether the frequency domain unit corresponding to each bit can be used for sidelink transmission.

21. The terminal device according to claim 13, wherein the first control information comprises third configuration information, and the third configuration information is used to determine frequency domain resource length information of each of the multiple transmissions of the sidelink.

22. The terminal device according to claim 21, wherein the frequency domain resource length information of each of the multiple transmissions is pre-configured on the terminal device.

23. The terminal device according to claim 21, wherein the first control information comprises fourth configuration information, the fourth configuration information is used to determine a frequency domain start position of each of the multiple transmissions, and the processor is further configured to:

determine the frequency domain resource length information of each of the multiple transmissions of the sidelink according to the third configuration information, and determine the frequency domain start position of each of the multiple transmissions according to the fourth configuration information; and determine a frequency domain resource of each of the multiple transmissions according to the frequency domain start position and the frequency domain resource length information of each of the multiple transmissions.

24. The terminal device according to claim 13, wherein the first control information is downlink control information (DCI), and the sidelink comprises at least one of a sidelink control channel (PSCCH) or a sidelink shared channel (PSSCH).

25. A method for transmitting data, comprising:

receiving, by a terminal device, first control information sent by a network device, wherein the first control information is used to determine resource information used for multiple transmissions of a sidelink; and determining, by the terminal device, a resource used for the multiple transmissions of the sidelink according to the first control information, wherein the resource information used for the multiple transmissions of the sidelink comprises at least one of time domain resource information or frequency domain resource information used for the multiple transmissions of the sidelink; and wherein the first control information comprises second configuration information, the second configuration information is used to determine time offset information of each of the multiple transmissions with respect to a specific boundary, and the determining, by the terminal device, the resource used for the multiple transmissions of the sidelink according to the first control information comprises:

determining, by the terminal device, a time domain resource used for each of the transmissions using the specific boundary as a reference according to a time offset of each of the transmissions with respect to the specific boundary.

26. A terminal device, comprising:

a processor; and a memory storing a computer program, wherein the processor is configured to call and run the computer program stored in the memory, and execute:

receiving first control information sent by a network device, wherein the first control information is used to determine resource information used for multiple transmissions of a sidelink; and determining a resource used for the multiple transmissions of the sidelink according to the first control information;

wherein the resource information used for the multiple transmissions of the sidelink comprises at least one of time domain resource information or frequency domain resource information used for the multiple transmissions of the sidelink; and wherein the first control information comprises second configuration information, the second configuration information is used to determine time offset information of each of the multiple transmissions with respect to a specific boundary, and the processor is further configured to:

determine a time domain resource used for each of the transmissions using the specific boundary as a reference according to a time offset of each of the transmissions with respect to the specific boundary.

* * * * *